United States Patent Office 3,528,831
Patented Sept. 15, 1970

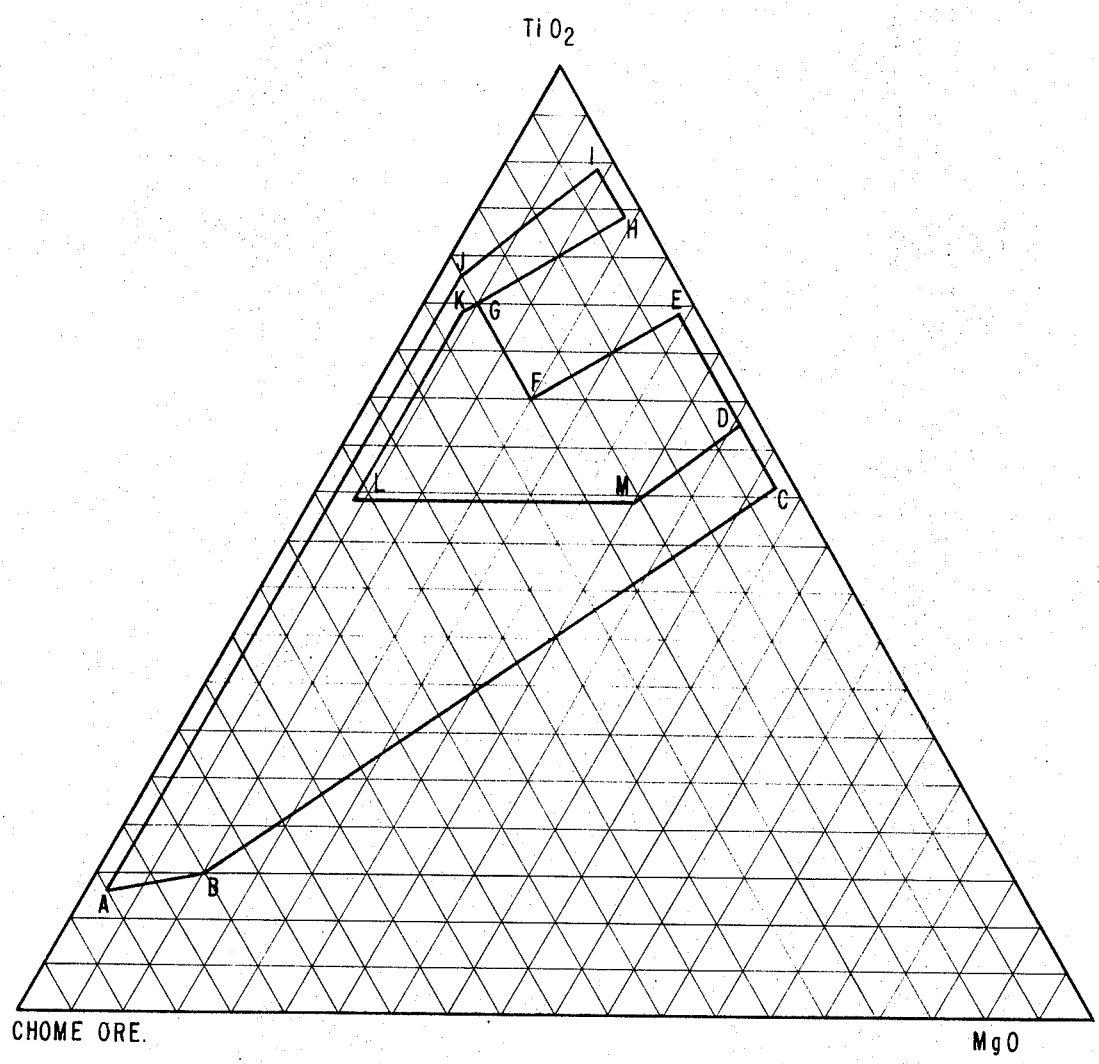

3,528,831
THERMAL SHOCK RESISTANT CERAMIC MATERIALS
Irwin M. Lachman, Corning, N.Y., assignor to Corning Glass Works, Corning, N.Y., a corporation of New York
Filed Sept. 15, 1967, Ser. No. 668,026
Int. Cl. C04b 35/42
U.S. Cl. 106—59     2 Claims

ABSTRACT OF THE DISCLOSURE

Ceramic bodies composed of a plurality of phases having markedly different coefficients of thermal expansion. The ceramic bodies are characterized by grain boundary and intracrystalline cracking. The ceramics have compositions which fall within the area and along the boundary defined by FIG. A, B, C, D, E, F, G, H, I, J, on the accompanying ternary compositional diagram of the chrome ore-$TiO_2$-MgO system. Compositions within the area of FIG. D, E, F, G, K, L, M are preferred. Articles are made by molding, pressing or otherwise forming raw material powders to the desired shape and then sintering the materials in an oxidizing atmosphere. Preferred products are liners for exhaust manifolds to facilitate complete combustion of exhaust gases from internal combustion engines or the like thereby reducing air pollution.

BACKGROUND OF THE INVENTION

Field of the invention

The present invention relates to thermal shock resistant sintered ceramic materials of the ternary compositional system chrome ore-$TiO_2$-MgO, and especially liners for exhaust manifolds formed from such materials.

Description of the prior art

The prior art discloses numerous ceramic compositions but most are not sufficiently resistant to extreme thermal shock. Materials are presently being sought to serve as liners for automobile exhaust manifolds, so that the temperature in the manifold may be kept sufficiently high to permit substantially complete combustion of residual hydrocarbons, thereby reducing air-pollution.

In extreme conditions, an auto manifold liner at subfreezing temperatures may suddenly be exposed to hot exhaust gases at 1400° C. In addition to the ability to resist severe thermal shock, the ceramic must also be sufficiently refractory to withstand temperatures on the order of 1400° C., and must have adequate resistance to chemical corrosion by the hot exhaust gases.

Prior art ceramics have generally failed with respect to one or more of these properties.

Therefore, the object of the present invention is to provide ceramic material capable of resisting severe thermal shock and having sufficient refractoriness and corrosion resistance to withstand contact with hot exhaust gases. A collateral object is to provide ceramic material having the foregoing properties which can be readily fabricated into a variety of desired structural shapes.

SUMMARY OF THE INVENTION

It has now been discovered that certain sintered ceramic compositions of the chrome ore-$TiO_2$-MgO compositional system provide articles which are characterized by grain boundary and intra-crystalline cracking and resistance to several thermal shock. The compositions are within the area and along the boundaries defined by the FIG. A, B, C, D, E, F, G, H, I, J on the ternary compositional diagram shown in the accompanying drawing. Preferred compositions are within the area defined by FIG. D, E, F, G, K, L, M.

BRIEF DESCRIPTION OF THE DRAWING

The drawing comprises a ternary compositional diagram of the system chrome ore-$TiO_2$-MgO on which the compositional limits of the ceramics of the invention are indicated by the areas and the boundaries defined by FIG. A, B, C, D, E, F, G, H, I, J and FIG. D, E, F, G, K, L, M.

DETAILED DESCRIPTION OF THE INVENTION

The ceramics of the invention are sintered materials having compositions falling within the area and along the boundaries defined by FIG. A, B, C, D, E, F, G, H, I, J and preferably within the area defined by FIG. D, E, F, G, K, L, M on the ternary compositional diagram of the system chrome ore-$TiO_2$-MgO which appears in the accompanying drawing.

The compositions of ceramics of the invention at the points of the foregoing figures are as follows:

| Point | Wt. percent | | |
|---|---|---|---|
| | Chrome ore | $TiO_2$ | MgO |
| A | 85 | 13 | 2 |
| B | 75 | 15 | 10 |
| C | 2 | 56 | 42 |
| D | 2 | 62 | 36 |
| E | 2 | 74 | 24 |
| F | 20 | 65 | 15 |
| G | 20 | 75 | 5 |
| H | 2 | 84 | 14 |
| I | 2 | 89 | 9 |
| J | 20 | 78 | 2 |
| K | 22 | 74 | 4 |
| L | 42 | 54 | 4 |
| M | 16 | 54 | 30 |

The ceramics of the present invention may be prepared from readily available oxide components.

Chrome ore from a number of sources may be employed. Chrome ore generally has the following composition, depending on source:

|  | Weight percent |
|---|---|
| $Cr_2O_3$ | From about 30 to 65 |
| FeO | From about 2 to 26 |
| $Al_2O_3$ | From about 9 to 29 |
| MgO | From about 11 to 19 |
| $SiO_2$ | Up to about 5 |
| CaO | Up to about 0.5 |
| $TiO_2$ | Up to about 1 |

Specific chrome ore raw materials have the following analyses on a percent by weight basis, identified by source:

| | Allied chem. solvay chrome | Iranian chrome ore | Low silica chrome ore | Transvaal chrome ore | Turkish chrome ore | Cuban chrome ore | Philippine chrome ore |
|---|---|---|---|---|---|---|---|
| $Cr_2O_3$ | 61 | 53 | 47 | 44 | 42 | 36 | 33 |
| FeO | 2 | 13 | 26 | 23 | 14 | 14 | 13 |
| $Al_2O_3$ | 20 | 9 | 13 | 13 | 20 | 27 | 29 |
| MgO | 13 | 17 | 11 | 12 | 17 | 15 | 19 |
| $SiO_2$ | 3 | 4 | 0.9 | 4 | 4 | 3 | 5 |
| CaO | 1 | | | 0.5 | 0.3 | | |
| $TiO_2$ | 1 | | | | | | |

The low silica chrome ore is an upgraded transvaal chrome ore and is preferred where the ceramic articles are in the form of exhaust manifold liners to reduce the extent of silica-lead reactions that may take place between the liner and lead or lead compounds in the exhaust gases. Chrome ore containing more than about 5% $SiO_2$ is generally not desirable as a raw material.

The following oxide formulations, prepared by mixing powders of the oxide components, may be used in forming the ceramic materials of the invention:

TABLE 1

| Composition No. | Weight percent | | |
|---|---|---|---|
| | Chrome ore | $TiO_2$ | MgO |
| 1 | 80 | 15 | 5 |
| 2 | 70 | 20 | 10 |
| 3 | 70 | 28 | 2 |
| 4 | 60 | 24 | 16 |
| 5 | 60 | 35 | 5 |
| 6 | 50 | 48 | 2 |
| 7 | 50 | 40 | 10 |
| 8 | 50 | 29 | 21 |
| 9 | 40 | 50 | 10 |
| 10 | 40 | 40 | 20 |
| 11 | 40 | 35 | 25 |
| 12 | 25 | 45 | 30 |
| 13 | 20 | 50 | 30 |
| 14 | 15 | 50 | 35 |
| 15 | 15 | 80 | 5 |
| 16 | 10 | 55 | 35 |
| 17 | 10 | 82 | 8 |
| 18 | 5 | 85 | 10 |
| 19 | 5 | 55 | 40 |
| (Preferred Compositions) | | | |
| 20 | 40 | 55 | 5 |
| 21 | 25 | 55 | 20 |
| 22 | 15 | 55 | 30 |
| 23 | 36 | 60 | 4 |
| 24 | 25 | 60 | 15 |
| 25 | 6 | 60 | 34 |
| 26 | 30 | 65 | 5 |
| 27 | 15 | 65 | 20 |
| 28 | 2 | 65 | 33 |
| 29 | 26 | 70 | 4 |
| 30 | 20 | 70 | 10 |
| 31 | 10 | 70 | 20 |
| 32 | 2 | 70 | 28 |
| 33 | 21 | 74 | 5 |
| 34 | 3 | 73 | 24 |

The raw materials used in making the present ceramics contain impurities in varying amounts, and such impurities may be tolerated in the composition so long as the basic properties of the resulting articles are not substantially affected.

Ceramic articles of the foregoing formulations may be prepared by known molding and forming techniques. Generally, the mixed raw material oxide powders are combined with a binder. They may then be dry pressed or are combined with a carrier liquid to form a slurry which is introduced into a mold and subjected to pressure. The green article is then fired in an oxidizing atmosphere in the sintering range of the materials, between 1500° C. and 1700° C., and cooled to yield the final product.

As an example of the dry pressing technique, a 50 g. batch of any of the foregoing formulations of Table 1 may be mixed with Chlorothene (Dow Chemical Co's inhibited 1,1,1-trichloroethane) 3% by weight of a binder, such as a polyethylene glycol, e.g., Carbowax 4000, and a few drops of fish oil, as a deflocculant. The batch is dried, granulated and pressed at about 5,000–10,000 p.s.i. in a ½" diameter die. The green pressed article is then fired in a gas, electric or other furnace in an oxidizing atmosphere.

In the slurry technique, such as the one described in U.S. Pat. No. 3,330,892, issued July 11, 1967, in the name of E. Herrmann, a batch of any of the formulations from Table 1 may be mixed with p-dichlorobenzene in an amount of about 20 gms. per 100 gms. of the batch. To this mixture there is added about 1 gm. per 100 gms. of batch of a deflocculant, such as, zinc stearate, and a like amount of a binder, such as, a polyethylene glycol, e.g., Carbowax 4000. The raw batch, having about 70% solids by volume, may then be pressed at about 3,000 p.s.i. to form a green article of the desired shape which is then fired. Articles may also be formed from the same slurry by injection molding, for example, at about 6,000 p.s.i.

The following are detailed examples of the preparation of ceramic articles in accordance with the invention:

EXAMPLE 1

15 gms. of low silica chrome ore, average particle size (APS) 1.1 microns, 5 gms. of MgO (Michigan magnesite, Magmaster #1), −200 mesh, and 30 gms. $TiO_2$ (Titanium Alloy Mfg., Frit Makers $TiO_2$) were hand mixed with enough Chlorothene (Dow Chemical Co's inhibited 1,1,1-trichlorethane) to make a slurry. This was dried and the powder pressed at 10,000 p.s.i. into parts. The parts were fired in a gas fired furnace at 1600° C., for 2 hours in an oxidizing atmosphere, then the temperature was lowered to 1400° C., and held for two additional hours.

EXAMPLE 2

2 gms. of low silica chrome ore, average particle size (APS) 1.1 microns, 13 gms. of MgO (Michigan magnesite, Magmaster #1), −200 mesh, and 35 gms. $TiO_2$ (Titanium Alloy Mfg., Frit Makers $TiO_2$) were hand mixed with enough Chlorothene (Dow Chemical Co.'s inhibited 1,1,1-trichlorethane) to make a slurry. This was dried and the powder pressed at 10,000 p.s.i. into parts. The parts were fired in a gas fired furnace in an oxidizing atmosphere at 1500° C., for 2 hours, then cooled to 1400° C., and held for an additional 2 hrs.

EXAMPLE 3

30 gms. of low silica chrome ore, average particle size (APS) 1.1 microns, 2.5 gms. of MgO (Michigan magnesite, Magmaster #1), −200 mesh, and 17.5 gms. $TiO_2$ (Titanium Alloy Mfg., Frit Makers $TiO_2$) were hand mixed with enough Chlorothene (Dow Chemical Co.'s inhibited 1,1,1-trichlorethane) to make a slurry. This was dried and the powder pressed at 10,000 p.s.i. into parts. The parts were fired in a gas fired furnace in an oxidizing atmosphere at 1600° C., for 2 hours, then cooled to 1450° C., and held for an additional 2 hours.

The ceramic articles produced in accordance with this invention withstand thermal shock testing in which a bar, approximately 1" x 6" x ⅛", constantly stressed in bending at about 150 p.s.i., is exposed to gases at 1400° C. After two minutes exposure, it is allowed to cool under room temperature conditions for at least five minutes, thus completing one thermal shock cycle. If failure does not occur during the heating-cooling cycle, the specimen is exposed to additional cycles. Specimens of Examples numbers 1 and 2 were exposed to 45 cycles at which time the test was discontinued even though failure had not occurred.

Microscopic examination of ceramic articles prepared in accordance with the invention clearly reveals grain boundary and intracrystalline cracking.

What is claimed is:

1. A ceramic article of the chrome ore-$TiO_2$-MgO system which is characterized by grain boundary and intracrystalline cracking and resistance to extreme thermal shock and corrosion by exhaust gases, said article having the composition analytically defined, on a percent by weight basis, by the area within and along the boundaries of the FIG. A, B, C, D, E, F, G, H, I, J of the ternary compositional diagram of the accompanying drawing.

2. A ceramic article as defined in claim 1 wherein said composition is within the area and along the boundaries of the FIG. D, E, F, G, K, L, M of the ternary compositional diagram of the accompanying drawing.

References Cited

UNITED STATES PATENTS 3,282,713   11/1966   McTaggart et al. _____ 106—59

JAMES E. POER, Primary Examiner

U.S. Cl. X.R.

106—66